ISOMERIC MIXTURE OF DIBROMOCRESYL GLYCIDYL ETHER

Toru Tanaka, Kenichi Mizoguchi, and Hiroto Nagaoka, Yamaguchi-ken, Japan, assignors to Nippon Kayaku Kabushiki Kaisha, Tokyo, Japan
No Drawing. Filed July 23, 1971, Ser. No. 165,729
Claims priority, application Japan, Aug. 7, 1970, 45/68,640
Int. Cl. C07d 1/04; C08g 51/74
U.S. Cl. 252—182       3 Claims

ABSTRACT OF THE DISCLOSURE

The present invention relates to an isomeric mixture of dibromocresyl glycidyl ether, composed of 65 to 95% of meta-isomer, 0 to 25% of ortho-isomer and 0 to 25% para-isomer, which, when combined with an epoxy resin composition prior to curing, confers fire-resistance on the cured product.

BACKGROUND OF THE INVENTION

It is well known that halogenides, phosphorus compounds, antimony trioxide, borate and hydrated aluminum function as fire-proofing agents for plastic materials. A mixture of the dibromocresyl glycidyl ethers as defined in the invention is superior to these known types of fire-proofing agents in that a smaller amount given sufficient fire-resistance because of the high bromine content of the ether mixture (about 50% by weight). The preferred amount to be combined with the epoxy resin is 10 to 50% by weight. Below this range the fire-proofing effect is insufficient, while above this range the physical properties of the cured resin are impaired. The ether mixture handles easily because it is liquid at room temperature. Within the preferred range it does not impair the physical properties of the cured resin because its molecule contains a reactive epoxy group. When the liquified dibromocresyl glycidyl ether mixture is mixed with an epoxy resin and its hardener a cured product with superior electric, mechanical and chemical properties is produced, which is useful for many applications requiring fire-resistance including casting resins, laminates, adhesives and coatings.

There is known a fire-proof epoxy resin comprising a base composed of halogenated bisphenol A-epihalohydrin condensate affording a highly fire-resistant cured product with excellent electric, mechanical and chemical properties. This resin, however, has the disadvantage that it is a solid or semi-solid at room temperature. It is therefore necessary to reduce its viscosity by heating or by dissolution in solvent or reactive diluent before blending with the hardener, filler, or other epoxy resin, etc.

Also there are known fire-proofing hardeners composed of reactive halogen compounds such as hexachloro-endo-methylene-tetrahydrophthalic anhydride, dichloromaleic, anhydride and tetrabromophthalic anhydride. These hardeners, however, have many disadvantages. Melting is required for blending them with an epoxy resin, since they are all solids with high melting points. Such melting remarkably shortens the pot life. Use of a solvent to facilitate the blending operation makes removal of the solvent prior to the curing process unavoidable and also makes it impossible to produce a product with considerable thickness.

It is also possible to add an organic or inorganic fire-proofing agent to the composition but such an agent impairs the transparency and other physical properties of the cured product.

It is the object of the present invention to provide a composition which overcomes the above-mentioned disadvantages.

SUMMARY

The present invention relates to an isomeric mixture of dibromocresyl glycidyl either. This isomeric mixture confers fire-resistance on a cured epoxy resin when the mixture is previously combined with the epoxy resin composition.

There are known three isomers in dibromocresyl glycidyl ether. They are ortho-, meta- and para-isomers, of which melting points are 74, 45.5 and 64° C., respectively. They are all solid at room temperature (25° C.) but an appropriately selected mixture of the three isomers has been found to maintain a low-viscous liquid state at room temperature.

The composition at which the mixture keeps liquid is 65–95% of meta-, 0–25% of para- and 0–25% of ortho-isomers. It will be understood that the mixture comprises either a binary or a trinary system. The binary system corresponds to the case in which the content of either para or ortho equals zero and the content of the other equals 5%–25%. In the trinary system, the sum of the para and ortho portion of the mixture equals 5%–35%, but neither the ortho or para isomer alone exceeds 25% of the mixture.

DETAILED DESCRIPTION

Dibromocresyl glycidyl ether is prepared in the usual manner as follows:

Cresol is dissolved in a solvent such as chloroform and trichlorethane. A theoretical amount of bromine is added to this solution at a temperature of 0 to 30° C. After reaction the solvent is evaporated. The residual matter is dibromocresol. The product is dissolved in an excess amount of epihalohydrin. Drops of aqueous alkali hydroxide solution is added to the organic solution either in the presence or in the absence of a tertiary amine catalyst at temperatures of 50 to 100° C. After the reaction, the organic layer is separated from the aqueous layer, and the excess epihalohydrin is removed by evaporation under reduced pressure. The residue is distilled under reduced pressure or washed with water to give dibromocresyl glycidyl ether.

The epoxy resin suitable for use with the dibromocresyl glycidyl ether mixture has two or more epoxy groups in each molecule, for example: polyglycidyl ethers, polyglycidyl esters and polyglycidyl amines prepared by the reaction of epichlorhydrin in the presence of basic catalyst with: polyhydric phenols such as bisphenol A, catechol and resorcinol; novolak type of polyhydric phenols such as phenol and cresol; polyhydric alcohols such as glycerin and ethylene glycol; aliphatic polycarboxylic acids such as oxalic, succinic, adipic and dimeric or trimeric linolenic acids; aromatic polycarboxylic acids such as phthalic, isophthalic and terephthalic acids; and amines such as aniline, toluidine, and bis-(4-aminophenyl) methane. The ether mixture can also be used with epoxides prepared by peracid process such as vinylcyclohexene dioxide, limonene dioxide, dicyclopentadiene dioxide, 3,4 - epoxy-6-methylcyclohexylmethyl - 3,4 - epoxy-6-methylcyclohexane-carboxylate, and with epoxydized polyolefins such as epoxydized polybutadiene and epoxydized vegetable oil.

Various types of known epoxy hardeners may be employed for curing, for example: aliphatic and aromatic, primary and secondary amines such as ethylene diamine, diethylene triamine, triethylene tetramine, N,N-diethyl-aminopropylamine, methane diamine, metaphenylene diamine, bis - (p - amino-phenyl) methane, bis-(p-amino-phenyl) sulfone, aniline-formaldehyde resin, dicyandiamide and the polyamide prepared from aliphatic polyamine and dimeric or trimeric unsaturated fatty acid; polycarboxylic acid anhydrides such as phthalic anhydride, methyl-endomethylene-tetrahydrophthalic anhydride, dodecenylsuccinic anhydride, hexahydrophthalic anhydride, trimellitic anhydride and pyromellitic anhydride; Friedel-Crafts catalysts such as $SnCl_4$, $ZnCl_2$, $BF_3$ and their organic complexes; and tertiary amines such as 2,4,6-tris(dimethylaminomethyl)-phenol and N,N-benzyl dimethylamine and organic salts thereof.

The isomeric mixture of dibromoscresyl glycidyl ether may be combined with other fire-proofing additives such as antimony trioxide, barium meta-borate, tris-(chlorethyl)-phosphate, tris-(2,3-bromopropyl) phosphate, chlorinated diphenyl and hexabromocyclododecane in order to improve the fire-proofing property by synergism.

Finally the ether mixture may contain fillers and dyes such as calcium carbonate, silica, mica, quartz powder, alumina, talc, metallic powder and glass fiber.

The following examples will further illustrate the present invention.

EXAMPLE 1

A flask, equipped with a thermometer, a dropping funnel, a stirrer and a water-cooled condenser connected to a water jet vacuum pump, via a vessel containing a stirred 20% aqueous solution of sodium hydroxide is charged with 108 g. of meta-cresol and 250 g. of chloroform. 320 g. of bromine is added dropwise to the flask over a period of 2 hours at 0–5° C. Hydrogen bromide is produced which when it comes in contact with the aqueous sodium hydroxide, produces sodium bromide. After the addition of the bromine is completed, stirring is continued for 30 minutes under the reduced pressure created by the water jet pump. The chloroform is then evaporated and the residue is washed with water to give 262 g. of dibromo-metacresol (yield 98.5%), with a bromine content of 60.1%.

266 g. of dibromo-metacresol is dissolved into 278 g. of epichlorohydrin. The solution is placed in a flask equipped with a thermometer, a stirrer, a dropping funnel and a condenser connected with a separating tube to recover epichlorohydrin from its azeotropic mixture with water. A 40% aqueous solution of sodium hydroxide is added dropwise from the dropping funnel into the solution at 95–100° C. over a period of 1.5 hours, during which water is removed as azeotropic mixture with epichlorohydrin. After the addition is completed removal of water is continued until the inner temperature reaches 118° C. The flask is stirred for an additional hour. After cooling the mixture, the deposit of sodium chloride is filtered off and the excess epichlorohydrin removed under reduced pressure. The residue is dissolved in toluene, washed with water to remove the toluene to give 305 g. of dibromo-metacresyl glycidyl ether (yield 94.7%). It contains 4.88% oxyrane oxygen (calcd. 4.97%) and 49.5% bromine (calcd. 49.7%), and melts at 45.5° C.

A similar procedure is used to produce dibromo-ortho-cresyl glycidyl ether (M.P. 74° C.) and dibromo-para-cresyl glycidyl ether (M.P. 64° C.) After homogeneous dissolution by heating, melting points were measured on several mixtures of these three isomers. The results are shown in the following Table I, in which the compositions are expressed as weight percentages.

TABLE I

| | | | | | | |
|---|---|---|---|---|---|---|
| Dibromo-m-cresyl glycidyl ether | 95 | 95 | 75 | 70 | 65 | 65 |
| Dibromo-o-cresyl glycidyl ether | 0 | 5 | 25 | 15 | 25 | 10 |
| Dibromo-p-cresyl glycidyl ether | 5 | 0 | 0 | 15 | 10 | 25 |
| Melting point (° C.) | 23 | 24 | 5 | 8 | 25 | 15 |

EXAMPLE 2

Dibromocresol is prepared by dissolving 108 g. of a mixture comprising 75 parts of meta-cresol, 15 parts of para-cresol and 10 parts of ortho-cresol in 300 g. of chloroform, adding 320 g. of bromine dropwise to the solution at 0–30° C. over a period of 2 hours. The reaction is allowed to continue for an additional 30 minutes. The hydrogen bromide and chloroform are removed by evaporation. The yield of dibromocresol is 251 g. (98%), and the bromine content is 60.0%.

266 g. of dibromocresol is dissolved in 278 g. of epichlorohydrin lg. of 30% aqueous trimethylamine solution is added 110 g. of 40% aqueous sodium hydroxide solution is added dropwise to the mixture at 70–80° C. over a period of one hour. After the addition, the reaction is continued for 30 minutes. The organic phase is separated from the water phase, excess epichlorohydrin removed by evaporation under reduced pressure and the residue is dissolved in benzene and washed with water. 296 g. of dibromocresyl glycidyl ether is obtained (yield 92%). It contains 4.8% oxyrane oxygen (calcd. 4.97%) and 49.3% bromine (calcd. 49.7%), and melts at 4° C.

A dibromocresyl glycidyl ether mixture consisting of 75 parts of the meta, 15 parts of the para and 10 parts of the ortho isomer, hereafter referred to as A, is mixed with various amounts of glycidyl ether, hereafter referred to as B, obtained by reacting epichlorohydrin with bis-(4-oxyphenyl)-dimethylmethane in the presence of alkali (Epikote 828, Shell Co.); 100 parts of the mixture of A and B is mixed with 3 parts of $BF_3$-monoethylamine complex and, if desired, a part of antimony trioxide. The mixture is heated to 100° C. for 4 hours and then to 150° C. for 2 hours until curing is completed. The fire-resistance and other physical properties of the cured product are summarized in Table II, where the last column refers to control.

In the tables, fire-resistance was evaluated by holding a 6 x ½ x ¼ inch test piece vertically, and touching its lower end (along the longitudinal axis) to the flame twice within a period of ten seconds. Such a procedure repeated five times, constituted the test. The row entitled "time of extinguishment" indicates the period during which burning continued after the test piece had been removed from the fire. The row entitled "aspect of burning" indicates whether drops of molten matter fell from the test piece. The row entitled "judgment" indicates whether the test piece was self-extinguishing, finally, bending strength, percent absorption of water, volume resistivity and dielectric constant are measured according to JIS K 6911, while Rockwell hardness is measured according to ASTM D 785-51.

TABLE II

| Blending ratio: | | | | | | | |
|---|---|---|---|---|---|---|---|
| (B) | 90 | 80 | 70 | 90 | 80 | 70 | 100 |
| (A) | 10 | 20 | 30 | 10 | 20 | 30 | 0 |
| $BF_3$-monoethylamine | 3 | 3 | 3 | 3 | 3 | 3 | 3 |
| Antimony trioxide | 0 | 0 | 0 | 1 | 1 | 1 | 0 |
| Bromine content (percent) | 4.8 | 9.5 | 14.3 | 4.7 | 9.4 | 14.1 | 0 |
| Fire-resistance: | | | | | | | |
| Time of extinguishment: | | | | | | | |
| First time: | | | | | | | |
| Range (sec.) | 4–55 | 1–2 | 0 | 0–8 | 0 | 0 | (a) |
| Average (sec.) | 19 | 1.8 | 0 | 2.5 | 0 | 0 | (a) |
| Second time: | | | | | | | |
| Range (sec.) | 12–71 | 1–8 | 2–4 | 2–24 | 1–4 | 1 | (a) |
| Average (sec.) | 31 | 3.5 | 3 | 11 | 2.3 | 1 | (a) |
| Aspect of burning | (b) | (b) | (b) | (b) | (b) | (b) | (b) |
| Judgment | (c) | (c) | (c) | (c) | (c) | (c) | (a) |
| Physical properties of cured pdt.: | | | | | | | |
| Bending strength (kg./cm.²) | 980 | 1,030 | 1,160 | 970 | 1,010 | 1,170 | 950 |
| Rockwell hardness (M) | 109 | 109 | 108 | 109 | 110 | 110 | 108 |
| Heat-distortion temperature (° C.) | 120 | 127 | 115 | 131 | 129 | 114 | 144 |
| Water absorption (at room temp. 24 hrs.) (percent) | 0.13 | 0.12 | 0.09 | 0.10 | 0.10 | 0.11 | 0.13 |
| Volume resistivity (Ω-cm.) | $4.5 \times 10^{15}$ | $4.0 \times 10^{15}$ | $2.0 \times 10^{15}$ | $3.2 \times 10^{15}$ | $2.6 \times 10^{15}$ | $2.0 \times 10^{15}$ | $4.6 \times 10^{15}$ |
| Dielectric constant (at 1,000 kc.) | 3.47 | 3.46 | 3.48 | 3.51 | 3.53 | 3.52 | 3.46 | a Inflammable.  b No dropping.  c Self-extinguish.

EXAMPLE 3

Mixtures comprising various proportions of A and B are combined with various amounts of diaminodiphenylmethane and cured at 100° C. for 2 hours and then at 150° C. for 2 hours. In another experiment, mixtures comprising various proportions of A and B are combined with Methylnadic Anhydride together with accelerator composed of 2,4,6-tris(dimethylaminomethyl)phenol (1 phr.) and cured at 100° C. for 2 hours and then at 150° C. for 4 hours. The fire-resistance and physical properties of these cured products are summarized in Table III, where the last column refers to control.

In the table the tests are carried out by the same procedures as described in Example 2.

EXAMPLE 4

Mixtures comprising various proportions of A and B are combined with various amounts of triethylene tetramine and polyamide (amine value 350–400) and cured at 100° C. for one hour. Fire-resistance and physical properties of the cured products are summarized in Table IV.

In the table, the testing procedures are the same as described in Example 2.

EXAMPLE 5

The procedure of Example 1 is followed to give an isomeric mixture of dibromocresyl glycidyl ether composed of 75% meta and 25% para (M.P. 15° C.), hereafter referred to as C, and another isomeric mixture composed of 80% meta and 20% ortho (M.P. 21° C.), here-

TABLE III

| Blending ratio: | | | | | | | |
|---|---|---|---|---|---|---|---|
| (B) | 90 | 80 | 70 | 90 | 80 | 70 | 100 |
| (A) | 10 | 20 | 30 | 10 | 20 | 30 | 0 |
| Diamino-diphenyl methane | 24 | 22 | 21 | | | | |
| Methyl-nadic anhydride | | | | 87 | 80 | 74 | 90 |
| Bromine content (percent) | 4.0 | 8.0 | 12.3 | 2.6 | 5.4 | 8.4 | 0 |
| Fire-resistance: | | | | | | | |
| Time of extinguishment: | | | | | | | |
| First time: | | | | | | | |
| Range (sec.) | 11-16 | 2 | 1 | 27-41 | 13-30 | 1-3 | (a) |
| Average (sec.) | 14 | 2 | 1 | 36 | 19 | 1.3 | (a) |
| Second time: | | | | | | | |
| Range (sec.) | 9-47 | 4-11 | 1-2 | 8-80 | 13-30 | 3-24 | (a) |
| Average (sec.) | 29 | 6 | 1.3 | 44 | 24 | 15 | (a) |
| Aspect of burning | (b) | (b) | (b) | (b) | (b) | (b) | (b) |
| Judgment | (c) | (c) | (c) | (c) | (c) | (c) | (c) |
| Physical properties of cured pdt.: | | | | | | | |
| Bending strength (kg./cm.²) | 1,250 | 1,220 | 1,240 | 1,260 | 1,310 | 1,210 | 1,240 |
| Rockwell hardness (M) | 108 | 109 | 105 | 111 | 110 | 109 | 112 |
| Heat-distortion temperature (° C.) | 140 | 126 | 110 | 130 | 125 | 115 | 138 |
| Water absorption (at room temp. 24 hrs.) (percent) | 0.08 | 0.07 | 0.07 | 0.07 | 0.07 | 0.06 | 0.07 |
| Volume resistivity (Ω-cm.) | $4.8 \times 10^{15}$ | $4.2 \times 10^{15}$ | $3.8 \times 10^{16}$ | $1.6 \times 10^{16}$ | $1.3 \times 10^{16}$ | $1.2 \times 10^{16}$ | $1.5 \times 10^{16}$ |
| Dielectric constant (at 1,000 kc.) | 3.80 | 3.78 | 3.76 | 3.18 | 3.18 | 3.17 | 3.17 | a Inflammable.  b No dropping.  c Self-extinguish.

TABLE IV

| Blending ratio: | | | | | | |
|---|---|---|---|---|---|---|
| (B) | 80 | 70 | 60 | 80 | 70 | 50 |
| (A) | 20 | 30 | 40 | 20 | 30 | 50 |
| Triethylene tetramine | 11.5 | 10 | 9 | | | |
| Polyamide | | | | 50 | 50 | 40 |
| Bromine content (percent) | 8.5 | 13.4 | 18.0 | 6.5 | 9.8 | 17.5 |
| Fire-resistance: | | | | | | |
| Time of extinguishment: | | | | | | |
| First time: | | | | | | |
| Range (sec.) | 2-17 | 1-7 | 0-1 | 7-45 | 6-35 | 1-2 |
| Average (sec.) | 9 | 3 | 0.3 | 19 | 21 | 1.3 |
| Second time: | | | | | | |
| Range (sec.) | 1-5 | 1-3 | 1-2 | 8-(a) | 2-13 | 1-2 |
| Average (sec.) | 3 | 1.8 | 1.8 | | 5.8 | 1.3 |
| Aspect of burning | (b) | (b) | (b) | (b) | (b) | (b) |
| Judgment | (c) | (c) | (c) | (c) | (c) | (c) |
| Physical properties of cured pdt.: | | | | | | |
| Bending strength (kg./cm.²) | 1,230 | 1,230 | 1,100 | 9,00 | 890 | 890 |
| Rockwell hardness (M) | 98 | 98 | 86 | 83 | 83 | 75 |
| Heat-distortion temperature (° C.) | 85 | 80 | 62 | 88 | 78 | 67 |
| Water absorption (at room temp. 24 hr.) (percent) | 0.06 | 0.03 | 0.04 | 0.08 | 0.09 | 0.08 | a Inflammable.  b Dropping.  c Self-extinguish.

TABLE V

| Blending ratio: | | | | | | |
|---|---|---|---|---|---|---|
| (B) | 85 | 85 | 85 | 85 | 80 | 80 |
| (C) | 15 | | | 15 | | |
| (D) | | 15 | | | 20 | 20 |
| 2-ethyl-4-methylimidazole | 4 | 4 | 4 | 4 | 4 | 4 |
| Hexabromo-cyclododecane | | | 5 | | 5 | |
| Tris (2,3-dibromopropyl)-phosphate | | | | 5 | | 5 |
| Fire resistance: | | | | | | |
| Time of extinguishment: | | | | | | |
| First time: | | | | | | |
| Range (sec.) | 5-46 | 7-53 | 2-19 | 2-8 | 0-2 | 0 |
| Average (sec.) | 11 | 22 | 8 | 6 | 1.1 | 0 |
| Second time: | | | | | | |
| Range (sec.) | 11-51 | 9-60 | 5-11 | 2-11 | 0-5 | 0-5 |
| Average (sec.) | 25 | 24 | 9 | 7 | 2.3 | 1.4 |
| Aspect of burning | (1) | (1) | (1) | (1) | (1) | (1) |
| Judgment | (2) | (2) | (2) | (2) | (2) | (2) |

1 No dropping.  2 Self-extinguish.

after referred to as D. C and D are combined with B, together with a fire-proofing agent, either hexabromocyclododecane or tris-(2,3-dibromopropyl)-phosphate. 2-ethyl-4-methyl-imidazol is added to the mixture, which is then cured. Curing conditions used are: 100° C. for one hour and then 150° C. for two hours. The fire-resistance and physical properties of the cured products are shown in Table V. The testing procedures are the same as described in Example 2.

EXAMPLE 6

A liquid mixture is prepared which comprises: 70 parts of novolak-epoxy resin (ECN 1235, Ciba); 30 parts of dibromocresyl glycidyl ether (85% meta, 10% para, 5% ortho, M.P. 6° C.) prepared by the procedure of Example 1; 65 parts of Methylnadic Anhydride (hardener); 1 part of benzyl dimethylamine (accelerator); and 100 parts of Methyloxytol (solvent). Glass cloth is impregnated with this liquid mixture and subjected to preliminary drying. Ten of the treated cloths are superimposed on one another and pressed into a laminated product. The fire-resistance and physical properties of the cured product are evaluated as follows:

curing conditions: 200° C., 60 minutes, pressure 8 kg./cm.$^2$
fiire-resistance: non-flammable (JIS K 6911)
bending strength: 4,710 kg./cm.$^2$ (longitudinal)
compressive strength: 4,220 kg./cm.$^2$ (longitudinal)
volume resistivity: $1.8 \times 10^{15}$ Ω-cm.
dielectric constant (1000 kc.): 3.2
dielectric tangent (1000 kc.): 0.021

We claim:
1. An isomeric mixture of dibromocresyl glycidyl ether comprising 65 to 95% of the meta-isomer, 0 to 25% of the ortho-isomer and 0 to 25% of the para-isomer with the proviso that if the proportion of ortho- or para-isomer is 0, the other will be 5 to 25%.

2. A process for preparing isomeric mixtures of dibromocresyl glycidyl ether by reacting an isomeric mixture of cresol comprising 65 to 95% of meta-cresol, 0 to 25% of ortho-cresol and 0 to 25% of para-cresol firstly with bromine and then with epihalohydrin in an alkaline system with the proviso that if the proportion of ortho- or para-isomer is 0, the other will be 5 to 25%.

3. A process for preparing isomeric mixtures of dibromocresyl glycidyl ether by separately reacting meta-cresol, ortho-cresol and para-cresol firstly with bromine and then with epihalohydrin in an alkaline system to give meta-, ortho- and para-dibromocresyl glycidyl ethers, followed by mixing the said glycidyl ethers obtained at a proportion defined by claim 1.

References Cited
UNITED STATES PATENTS

| 3,268,619 | 8/1966 | Nametz | 260—348 R |
| 3,504,000 | 3/1970 | Pittman et al. | 260—348 R |
| 3,536,734 | 10/1970 | Vegter et al. | 260—348 R |

FOREIGN PATENTS

| 953,206 | 3/1964 | Great Britain | 260—348 R |

LEON D. ROSDOL, Primary Examiner

I. GLUCK, Assistant Examiner

U.S. Cl. X.R.

260—47 EP, 47 EN, 59, 348 R, 348.6